United States Patent
Corneliussen (10) Patent No.: US 9,677,253 B1
(45) Date of Patent: Jun. 13, 2017

(54) WATER FLOW CONTROL ASSEMBLY FOR A SHOWERHEAD

(71) Applicant: Theis Corneliussen, Redlands, CA (US)

(72) Inventor: Theis Corneliussen, Redlands, CA (US)

( * ) Notice: Subject to any disclaimer, the term of this patent is extended or adjusted under 35 U.S.C. 154(b) by 1 day.

(21) Appl. No.: 14/840,994

(22) Filed: Aug. 31, 2015

(51) Int. Cl.
| | |
|---|---|
| *A47K 3/022* | (2006.01) |
| *E03C 1/04* | (2006.01) |
| *F16K 31/06* | (2006.01) |
| *F16K 31/42* | (2006.01) |
| *E03C 1/05* | (2006.01) |
| *E03C 1/02* | (2006.01) |

(52) U.S. Cl.
CPC ............... *E03C 1/04* (2013.01); *E03C 1/052* (2013.01); *F16K 31/0644* (2013.01); *F16K 31/42* (2013.01); *E03C 2001/026* (2013.01)

(58) Field of Classification Search
CPC ...................................... E03D 11/02
USPC ...................................... 4/596–613
See application file for complete search history.

(56) References Cited

U.S. PATENT DOCUMENTS

| | | | | |
|---|---|---|---|---|
| 2,839,264 A * | 6/1958 | Trubert | ........... | F16K 21/12 251/295 |
| 2,966,328 A * | 12/1960 | Burnworth | ........... | B60K 26/02 137/528 |
| 3,188,011 A * | 6/1965 | Ternullo | ........... | A01G 25/16 239/242 |
| 4,729,135 A * | 3/1988 | Titterington | ........... | F16K 31/12 239/578 |
| 4,934,000 A * | 6/1990 | Freedman | ........... | A47K 3/001 239/569 |
| 5,173,972 A * | 12/1992 | Goodman | ........... | A47C 3/022 239/543 |
| 5,297,774 A * | 3/1994 | Chuang | ........... | F16K 31/1262 137/801 |
| 5,408,709 A * | 4/1995 | Lockwood | ........... | E03C 1/06 251/46 |
| 5,689,843 A * | 11/1997 | Duke | ........... | E03C 1/052 251/295 |
| 6,299,035 B1 * | 10/2001 | Dalhart | ........... | B05B 7/30 222/505 |
| 6,322,005 B1 * | 11/2001 | Kern | ........... | E03C 1/052 239/444 |
| 6,474,621 B1 * | 11/2002 | Vogel | ........... | E03C 1/041 137/382 |
| 6,647,568 B2 * | 11/2003 | Bentley | ........... | E03C 1/052 251/295 |

(Continued)

*Primary Examiner* — Lori Baker (57) ABSTRACT

A foot-operated water flow control system for regulating water flow to a shower head. The shower head is connected to a first shower arm. A second shower arm is connected to a water supply line. A solenoid valve has an inlet port connected to the first shower arm and an outlet port connected to the second shower arm. A first electrical wire connects the solenoid valve to a power source, a second electrical wire connects an air pressure switch to the power source, and a third electrical wire connects the air pressure to the solenoid valve. An air pump is connected to the air pressure switch via an air hose. Foot compression of the air pump generates air pressure to close the air pressure switch. The power source supplies electrical power to the solenoid valve, which is actuated into an opened position and water flows to the shower head.

2 Claims, 6 Drawing Sheets

(56) References Cited

U.S. PATENT DOCUMENTS

| | | | | |
|---|---|---|---|---|
| 6,651,271 B2* | 11/2003 | Bentley | ............... | E03C 1/052 |
| | | | | 4/604 |
| 9,422,694 B2* | 8/2016 | Pelletier | ............... | E03C 1/025 |
| 2009/0293189 A1* | 12/2009 | Somerville | ............... | B05B 1/18 |
| | | | | 4/597 |
| 2014/0115772 A1* | 5/2014 | Janakiraman | ......... | E03C 1/0408 |
| | | | | 4/597 |

\* cited by examiner

WATER FLOW CONTROL ASSEMBLY FOR A SHOWERHEAD

FIELD OF THE INVENTION

The present invention relates to a flow control assembly for controlling water issuing from a shower head, thereby conserving water by reducing the amount of water required for showering.

BACKGROUND OF THE INVENTION

In typical shower systems, a showerhead is a perforated nozzle positioned to direct a continuous water stream on a person. The temperature and water pressure are regulated by a shower faucet. When a person takes a shower, the flow of water is normally continuous until the showering procedure is completed; however, this continuous flow is unnecessary. For example, a person will move away from the water stream while lathering his or her body, and then return to the water stream for rinsing. Although less water is generally required during a typical shower, there remains a large amount of water that is unused and wasted by the continuous flow.

One solution is to shut the water off while the person lathers. However, the repeated starting and stopping of the water stream in conventional shower faucets and valve structures is inconvenient and time-consuming. When the water stream is turned back on after lathering, the water flow pressure and temperature would need to be readjusted, which is uncomfortable since the initial water stream is usually too cold or too hot during the adjustment period. Again, this initial water stream is wasted since the person will avoid contact with the cold or hot water.

U.S. Pat. No. 4,729,135 to Titterington teaches a forced flow of an activation fluid forcibly moves a positioning element towards a distal end of the positioning chamber thereby causing rotation of a valve element connected to move with the positioning element.

Hence, there is a need for a flow control system for a shower that is easy to operate and that effectively regulates the water flow without having to constantly readjust the water pressure and temperature.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

According to an embodiment of the present invention, a foot-operated water flow control system for regulating water flow to a shower head is described herein. The system may be effective for maintaining a constant temperature and water pressure in the water flow to the shower head.

In one embodiment, the system may comprise the shower head fluidly connected to a first shower arm, a second shower arm fluidly connected to a water supply line, a two-port solenoid valve for regulating water flow to the shower head, an air pressure switch operatively connected to the solenoid valve, a power source operatively connected to the air pressure switch and the solenoid valve, and a foot-operated air pump having a variable volume air chamber. An electrical circuit may be formed by a first electrical wire connecting the solenoid valve to the power source, a second electrical wire connecting the air pressure switch to the power source, and a third electrical wire connecting the air pressure to the solenoid valve.

In another embodiment, the solenoid valve may have an inlet port fluidly connected to the first shower arm and an outlet port fluidly connected to the second shower arm. An interior channel of the solenoid valve fluidly connecting the inlet port and the outlet port is blocked by a valve component to prevent water from flowing through the interior channel. When the valve component of the solenoid valve is actuated, the interior channel of the solenoid valve is opened, or unobstructed, to allow for water to flow through the channel.

In some embodiments, the air chamber may be fluidly connected to an air hose, which is operatively connected to the air pressure switch. When the air chamber is in the expanded position, the air pressure switch is configured to be opened, the solenoid valve is in the closed position, and water is blocked from flowing to the shower head. To start the water flow, a user may step on the air pump such that his or her foot exerts pressure upon the air pump to compress the air chamber into a collapsed position. Air pressure can close the air pressure switch, thereby completing the electrical circuit. Electrical power is supplied to the solenoid valve via the power source and the solenoid valve is actuated into an opened position to allow water to flow to the shower head.

DESCRIPTION OF PREFERRED EMBODIMENTS

Following is a list of elements corresponding to a particular element referred to herein:

100 foot-operated water flow control system
105 water supply line
110 shower head
111 first shower arm
112 second shower arm
115 housing
120 two-port solenoid valve
121 outlet port 122 inlet port
130 air pressure switch
135 air inlet port
140 power source
150 air pump
152 variable volume air chamber
155 air hose
160 electrical circuit
161 first electrical wire
162 second electrical wire
163 third electrical wire Referring now to FIG. 1-11, the present invention features a foot-operated water flow control system (100) for regulating water flow to a shower head (110). The system (100) may be effective for maintaining a constant temperature and water pressure in the water flow to the shower head (110). In some embodiments, the system (100) may comprise the shower head (110) fluidly connected to a first shower arm (111), a second shower arm (112) fluidly connected to a water supply line (105), a two-port solenoid valve (120) for regulating water flow to the shower head (110), an air pressure switch (130) operatively connected to the solenoid valve (120), a power source (140) operatively connected to the air pressure switch (130) and the solenoid valve (120), and a foot-operated air pump (150) having a variable volume air chamber (152).

Figure 4:
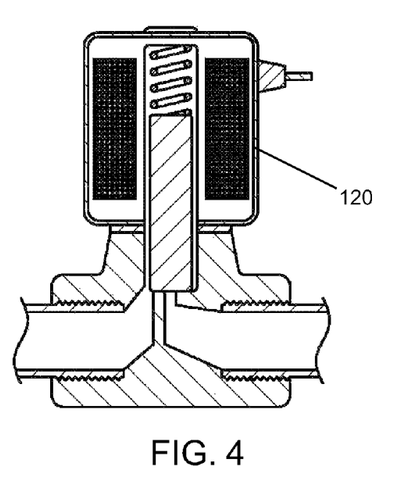
FIG. 4 shows a cross-sectional view of a solenoid valve in a closed position to stop water flow.
Figure 5:
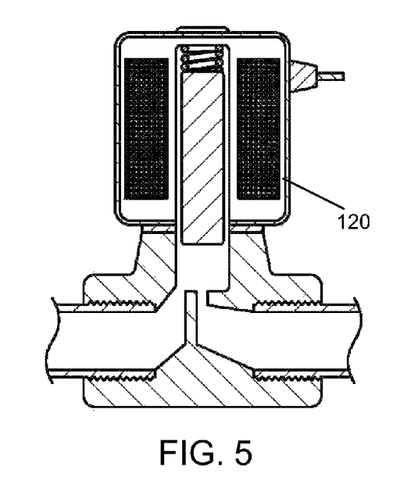
FIG. 5 shows a cross-sectional view of a solenoid valve in an open position.

In one embodiment, the solenoid valve (120) may have an outlet port (121) fluidly connected to the first shower arm (111) and an inlet port (122) fluidly connected to the second shower arm (112). Preferably, the solenoid valve (120) is biased to be in a closed position. Also, the solenoid valve may be coaxial such that the inlet port and the outlet port are disposed on the same plane. For example, an interior channel fluidly connecting the inlet port and the outlet port is blocked by a valve component to prevent water from flowing through the interior channel. When the valve component is actuated, the interior channel is opened, or unobstructed, to allow for water to flow through the channel.

In some embodiments, the variable volume air chamber (152) may be biased to be in an expanded position. The air chamber (152) may be fluidly connected to an air hose (155), which is operatively connected to the air pressure switch (130). The air chamber (152) can store air for activating the air pressure switch (130). For instance, when the air chamber (152) is in the expanded position, the air pressure switch (130) is configured to be opened, the solenoid valve (120) is in the closed position, and water is prevented from flowing to the shower head (110).

To start the water flow, a user may step on the air pump (150) such that his or her foot exerts pressure upon the air pump (150) to compress the air chamber (152) into a collapsed position. The air in the air chamber (152) is pressurized and is directed to flow through the air hose (155), which may be operatively connected to the air pressure switch (130) via an air inlet port (135). Air pressure can close the air pressure switch (130), thereby completing the electrical circuit. Electrical power is supplied to the solenoid valve (120) via the power source (140) and the solenoid valve (120) is actuated into an opened position to allow water to flow to the shower head (110). For example, the electrical circuit (160) may be formed by a first electrical wire (161) connecting the solenoid valve (120) to the power source (140), a second electrical wire (162) connecting the air pressure switch (130) to the power source (140), and a third electrical wire (163) connecting the air pressure (130) to the solenoid valve (120).

In some embodiments, the air pump (150) may be a collapsible and sufficiently flexible structure. For example, the air pump may be a bellows air pump, similar to an accordion. As another example, the air pump may be a cylindrical structure, a ball-shaped structure, or a bulb. The air pump may be constructed from a flexible material such as a rubber, an elastomer, or a thermoplastic. In other embodiments, the air pump (150) may be any air pump having sufficient volume to generate pressurized air for activating the air pressure switch (130). Preferably, the air pump (150) is disposed on a shower floor to be easily accessible to a user's foot. The air pump (150) may be sized to fit under a user's foot and without obstructing the shower floor. For instance, the air pump may have a maximum dimension of 12 inches, such as a diameter of at most 12 inches. In other embodiments, the air pump may have a maximum dimension of 10 inches, 8 inches, 6 inches, or 4 inches.

Figure 1:
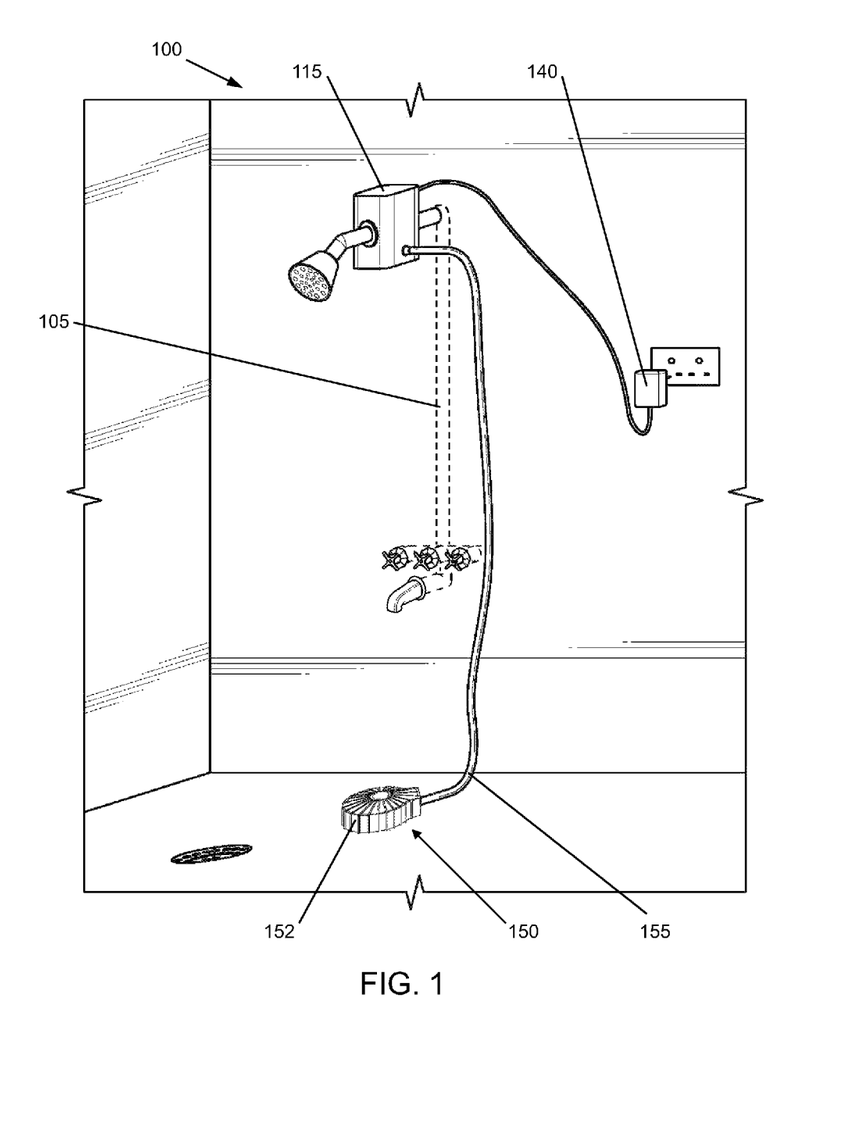
FIG. 1 shows an in-use perspective view of the present invention.
Figure 2:
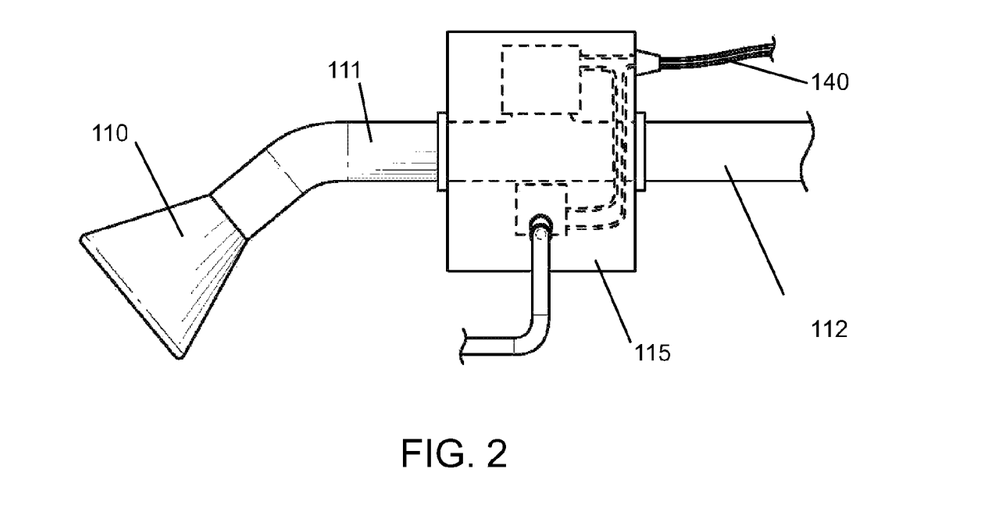
FIG. 2 shows a side view of an embodiment of the present invention having a plug-in power source.
Figure 3:
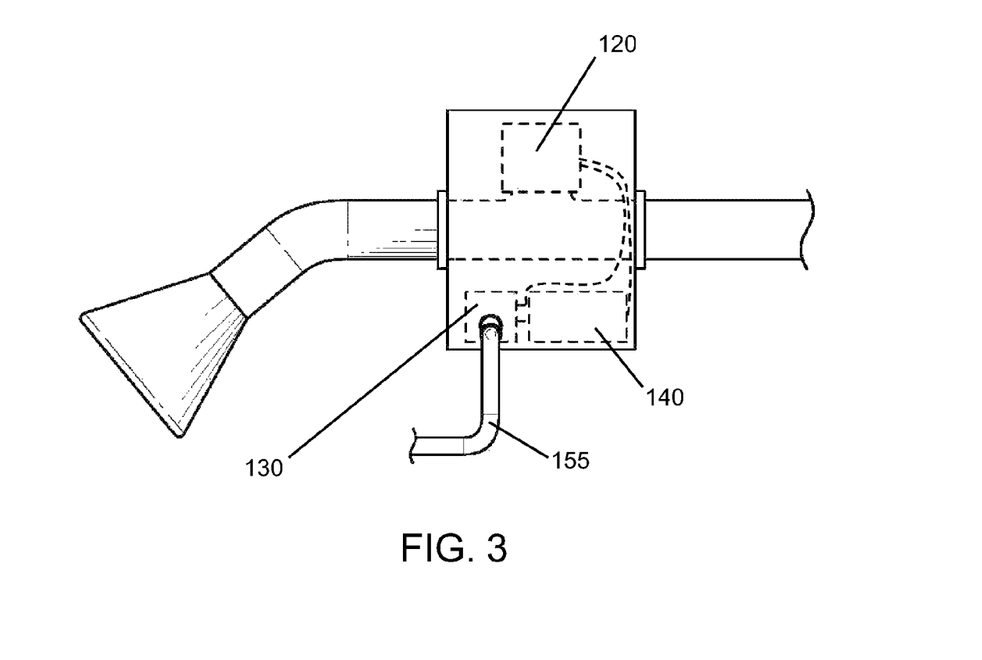
FIG. 3 shows a side view of an embodiment of the present invention having a battery power source.

In one embodiment, the power source (140) may be a direct current (DC) power source. For example, the power source is a wall outlet. In another embodiment, the power source (140) may be a battery.

Another embodiment of the present invention may feature a foot-operated water flow control system (100) consisting of a shower head (110), a first shower arm (111) fluidly connected to the shower head (110) a second shower arm (112) fluidly connected to a water supply line (105), a two-port solenoid valve (120) for regulating water flow to the shower head (110), an air pressure switch (130) operatively connected to the solenoid valve (120), a power source (140) operatively connected to the air pressure switch (130) and the solenoid valve (120), and a foot-operated air pump (150) consisting of a variable volume air chamber (152). An outlet port (121) of the solenoid valve (120) may be fluidly connected to the first shower arm (111) and an inlet port (122) of the solenoid valve (120) may be fluidly connected to the second shower arm (112). An electrical circuit (160) is formed by a first electrical wire (161) connecting the solenoid valve (120) to the power source (140), a second electrical wire (162) connecting the air pressure switch (130) to the power source (140), and a third electrical wire (163) connecting the air pressure switch (130) to the solenoid valve (120).

In further embodiments of the present invention, the foot-operated water flow control system (100) may comprise a shower head (110), a first shower arm (111) fluidly connected to the shower head (110), a second shower arm (112) fluidly connected to a water supply line (105), a housing (115), a two-port solenoid valve (120) disposed inside the housing (115), an air pressure switch (130) disposed inside the housing (115), an air pressure switch (130) operatively connected to the solenoid valve (120), a power source (140) operatively connected to the air pressure switch (130) and the solenoid valve (120), a foot-operated air pump (150) having a variable volume air chamber (152), and an air hose (155) operatively connected to the air pressure switch (130). An electrical circuit (160) may be formed by a first electrical wire (161) connecting the solenoid valve (120) to the power source (140), a second electrical wire (162) connecting the air pressure switch (130) to the power source (140), and a third electrical wire (163) connecting the air pressure switch (130) to the solenoid valve (120). Preferably, at least the second electrical wire (162) is disposed in the housing.

Figure 6:
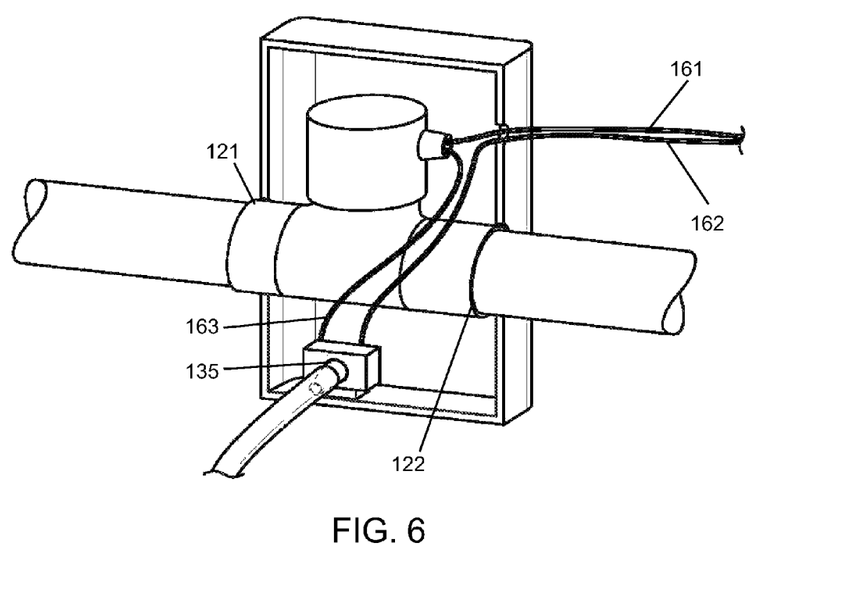
FIG. 6 shows a close-up view of the solenoid valve and an air pressure switch disposed in a housing of the present invention.

In some embodiment, the solenoid valve (120) can regulate water flow to the shower head (110). The solenoid valve (120) may have an outlet port (121) fluidly connected to the first shower arm (111) and an inlet port (122) fluidly connected to the second shower arm (112) such that the housing (115) is disposed between the first shower arm (111) and the second shower arm (112). In one embodiment, the outlet port (121) and the inlet port (122) may project outwardly and away from the housing (115). In another embodiment, the outlet port (121) and the inlet port (122) may be flushed with the housing (115). For example, the housing (115) may be in the shape of a rectangular prism such that the outlet port (121) and the inlet port (122) are disposed on opposing sides of the housing (115). In other embodiments, the housing (115) may be in the shape of a cylindrical structure.

In other embodiments, the air pressure switch (130) may have an air inlet port (135) that projects outwardly from the housing (115). The air hose (155) can fluidly connect the air chamber (152) to the air pressure switch (130). For example, the air hose (155) may be operatively connected to the air pressure switch (130) via the air inlet port (135), which receives air pressure from the air hose (155) for activation of the air pressure switch (130).

Figure 7:
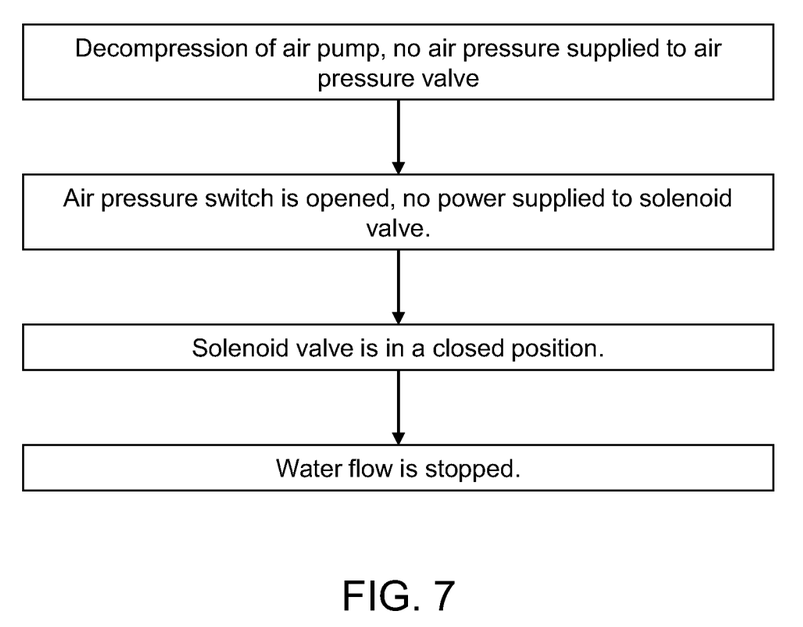
FIG. 7 shows a flow diagram of stopping water flow to the shower head.
Figure 8:
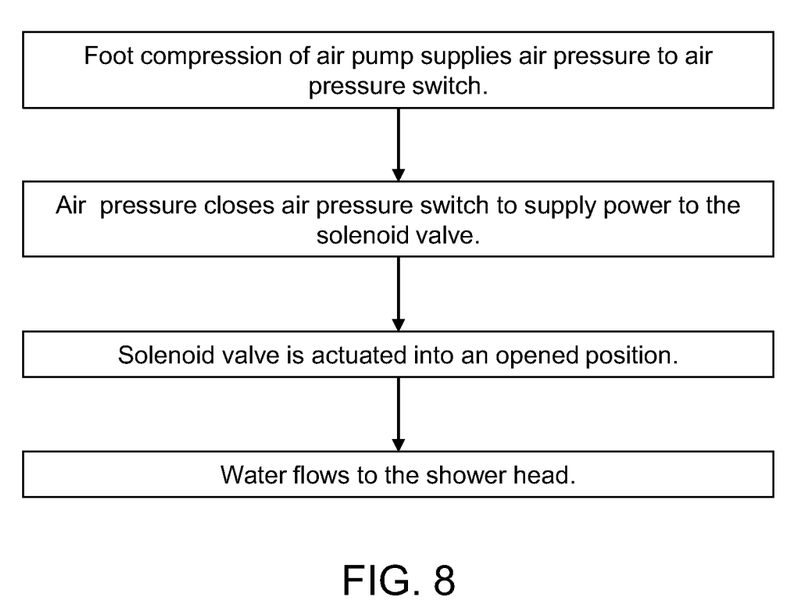
FIG. 8 shows a flow diagram of initiating water flow to the shower head.

When the air chamber (152) is in the expanded position, the air pressure switch (130) is configured to be opened, the solenoid valve (120) is in the closed position, and water is prevented from flowing to the shower head (110). When a user's foot exerts pressure on the air pump (150) to compress the air chamber (152) into a collapsed position, air pressure flows to the air pressure switch (130) via the air hose (155) and the air pressure switch (130) is closed to complete the electrical circuit (160). Electrical power is then supplied to the solenoid valve (120) via the power source (140) and the solenoid valve (120) is actuated into an opened position to allow water to flow to the shower head (110).

Figure 9:
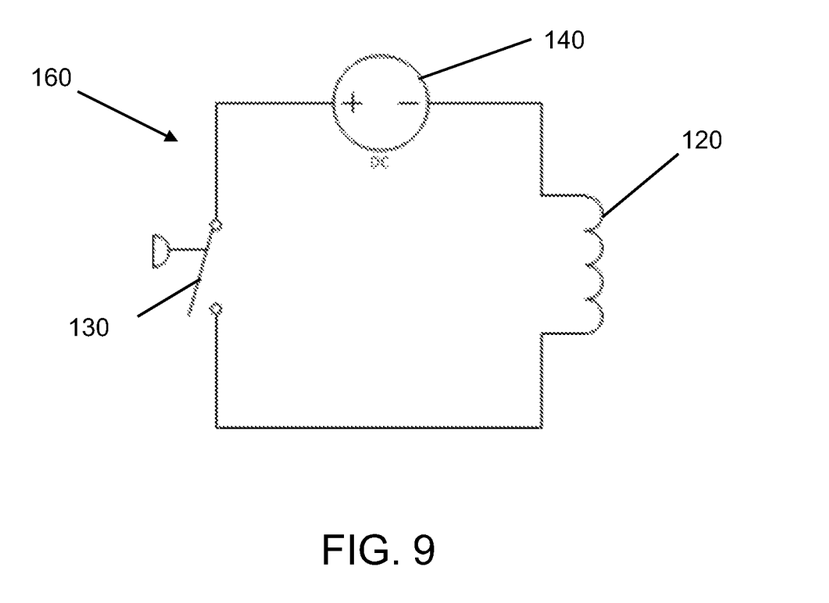
FIG. 9 shows an electrical diagram with a plug-in power source according to an embodiment of the present invention.
Figure 10:
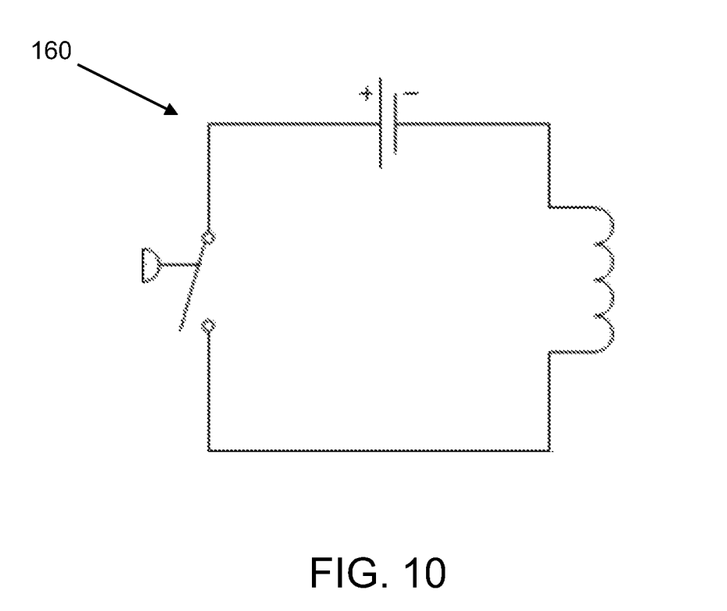
FIG. 10 shows an electrical diagram with a battery power source according to an embodiment of the present invention.
Figure 11:
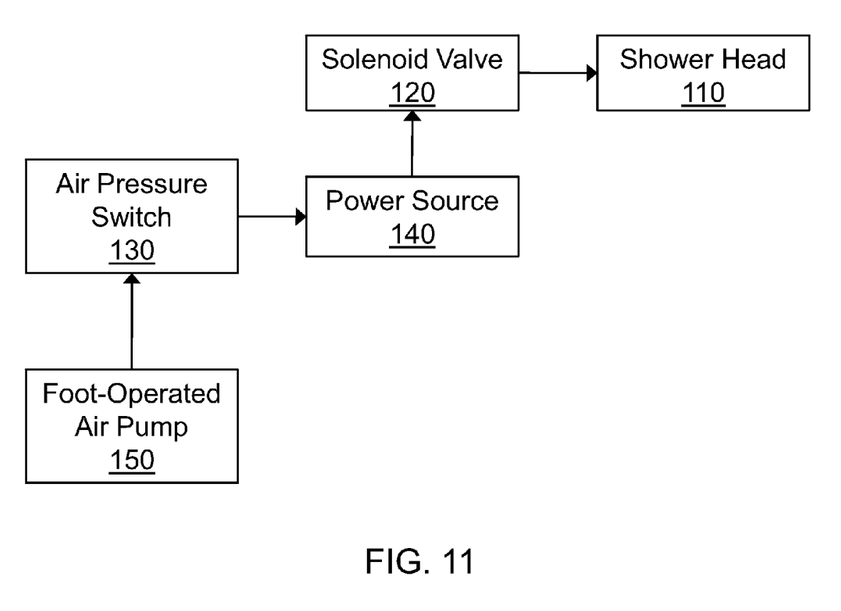
FIG. 11 shows a block diagram of the present invention.

In one embodiment, the power source (140) is a direct current (DC) power source. At least a portion of the first electrical wire (161) and a portion of the third electrical wire (163) are disposed outside of the housing (115). For example, the first electrical wire (161) and the third electrical wire (163) are in the form of a power cord that can be plugged into a wall outlet. In another embodiment, the power source (140) may be disposed inside the housing (115). The first electrical wire (161) and the third electrical wire (163) may also be disposed inside the housing (115). For example, the power source (140) may be a battery.

As used herein, the term "about" refers to plus or minus 10% of the referenced number.

The disclosures of the following U.S. Patents are incorporated in their entirety by reference herein: U.S. Pat. No. 4,729,135.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A foot-operated water flow control system for regulating water flow to a shower head, said system comprising:
   a. the shower head fluidly connected to a first shower arm;
   b. a second shower arm fluidly connected to a water supply line;
   c. a two-port solenoid valve for regulating water flow to the shower head, the solenoid valve having an outlet port fluidly connected to the first shower arm and an inlet port fluidly connected to the second shower arm, wherein the solenoid valve is biased to be in a closed position;
   d. an air pressure switch operatively connected to the solenoid valve;
   e. a power source operatively connected to the air pressure switch and the solenoid valve; and
   f. a foot-operated air pump having a variable volume air chamber fluidly connected to an air hose, wherein the air hose is operatively connected to the air pressure switch, wherein the air chamber is biased to be in an expanded position;
   wherein when the air chamber is in the expanded position, the air pressure switch is configured to be opened, wherein the solenoid valve is in a closed position to prevent water from flowing to the shower head,
   wherein an electrical circuit is formed by a first electrical wire connecting the solenoid valve to the power source, a second electrical wire connecting the air pressure switch to the power source, and a third electrical wire connecting the air pressure switch to the solenoid valve,
   wherein when a foot exerts pressure on the air pump to compress the air chamber into a collapsed position, air pressure flows to the air pressure switch via the air hose and the air pressure switch is closed, wherein electrical power is supplied to the solenoid valve via the power source and the solenoid valve is actuated into an opened position to allow water to flow to the shower head,
   wherein the foot-operated water flow control system is effective for maintaining a constant temperature and water pressure in the water flow to the shower head.

2. A foot-operated water flow control system for regulating water flow to a shower head, said system consisting of:
   a. the shower head;
   b. a first shower arm fluidly connected to the shower head;
   c. a second shower arm fluidly connected to a water supply line;
   d. a two-port solenoid valve for regulating water flow to the shower head, wherein an outlet port of the solenoid valve is fluidly connected to the first shower arm and an inlet port of the solenoid valve is fluidly connected to the second shower arm, wherein the solenoid valve is biased to be in a closed position;
   e. an air pressure switch operatively connected to the solenoid valve;

f. a power source operatively connected to the air pressure switch and the solenoid valve; and g. a foot-operated air pump consisting of a variable volume air chamber, wherein the air pump is fluidly connected to an air hose, wherein the air hose is operatively connected to the air pressure switch an air inlet port of the air pressure switch, wherein the air chamber is biased to be in an expanded position;

wherein when the air chamber is in the expanded position, the air pressure switch is configured to be opened, wherein the solenoid valve is in a closed position to prevent water from flowing to the shower head, wherein an electrical circuit is formed by a first electrical wire connecting the solenoid valve to the power source, a second electrical wire connecting the air pressure switch to the power source, and a third electrical wire connecting the air pressure switch to the solenoid valve, wherein when a foot exerts pressure on the air pump to compress the air chamber into a collapsed position, air pressure flows to the air pressure switch via the air hose and the air pressure switch is closed, wherein electrical power is supplied to the solenoid valve via the power source and the solenoid valve is actuated into an opened position to allow water to flow to the shower head, wherein the foot-operated water flow control system is effective for maintaining a constant temperature and water pressure in the water flow to the shower head.

\* \* \* \* \*